United States Patent
Provenzano et al.

(10) Patent No.: US 9,883,653 B2
(45) Date of Patent: Feb. 6, 2018

(54) ANIMAL LITTER COMPOSITION WITH MULTIPLE FUNCTIONALITIES

(71) Applicants: Joseph L. Provenzano, Huntington Beach, CA (US); Mark A. Litman, Edina, MN (US); Kenneth R. Code, Edmonton (CA)

(72) Inventors: Joseph L. Provenzano, Huntington Beach, CA (US); Mark A. Litman, Edina, MN (US); Kenneth R. Code, Edmonton (CA)

( * ) Notice: Subject to any disclaimer, the term of this patent is extended or adjusted under 35 U.S.C. 154(b) by 281 days.

(21) Appl. No.: 14/934,193

(22) Filed: Nov. 6, 2015

(65) Prior Publication Data
US 2017/0127644 A1 May 11, 2017

(51) Int. Cl.
*A01K 29/00* (2006.01)
*A01K 1/015* (2006.01)
(52) U.S. Cl.
CPC .......... *A01K 1/0154* (2013.01); *A01K 1/0152* (2013.01); *A01K 1/0155* (2013.01)

(58) Field of Classification Search
CPC ... A01K 1/0152; A01K 1/0154; A01K 1/0155
USPC .......................................... 119/171, 172, 173
See application file for complete search history.

(56) References Cited

U.S. PATENT DOCUMENTS

| | | | | |
|---|---|---|---|---|
| 5,146,877 A | * | 9/1992 | Jaffee | A01K 1/0154 119/172 |
| 6,543,385 B2 | * | 4/2003 | Raymond | A01K 1/0154 119/171 |

* cited by examiner

*Primary Examiner* — David J Parsley
(74) *Attorney, Agent, or Firm* — Mark A. Litman & Associates, P.A.

(57) ABSTRACT

A litter composition is used in the absorption of animal wastes with aqueous content in the waste. The composition may include: a particulate water-absorbing solids carrier; two solid particles of separate salts that will react in the presence of water to generate molecular iodine; and a solid acid releasing system that releases acid in the presence of the water generating iodine in sufficient amount to maintain a pH of between 3.5 and 7.5 with the reacted residue of the two solid particles and the released acid in the water.

20 Claims, No Drawings

ANIMAL LITTER COMPOSITION WITH MULTIPLE FUNCTIONALITIES

BACKGROUND OF THE INVENTION

1. Field of the Invention

The present invention relates to the field of animal litter for residential, agricultural, private or commercial uses. The field more particularly relates to animal litter, such as residential cat litter, that provides multiple functions during used, each of the multiple functions selected from the group consisting of use indication, anti-odor activity, antimicrobial activity, and clumping action, while providing a safe environment for the animals using the litter.

2. Background of the Art

Animal waste control is a complex environment issue. The nature of the control impacts both small and macro-environments, and its function should be compatible with both personal and large scale requirements. The issue is most difficult to control on personal levels. Individuals are responsible for the waste management of their individual pets, and yet seek the most convenient methods with minimum individual efforts. Large scale animal waste control is even more complex.

One of the most common small scale or residential scale methods of addressing animal waste involves containment of cat or other small animal solid and liquid wastes. Cat litter is most commonly used, and such litter basically includes a liquid absorbent mass (usually in particle or small volume fibers or shreds), to which various other specific functional materials have been added. Fragrances and more recently clumping agents have been added to the absorbent mass. As the litter products are highly price competitive, amounts, numbers and types of additives have to be balanced against market realities, and only where the additives can provide a significant benefit to the product that can be readily sensed by the commercial user and provide a significant marketing advantage will additional additives be provided.

Clumping agents are used for adhering particulate matter in response to absorbing moisture or liquid. A common example of the use of clumping agents is that of animal litter, where, in response to contact with animal urine or secretions, the litter absorbs the liquid and the clumping agent forms a grouping or clump of litter material for removal and disposal. Clumping agents may also be used for chemical spill clean ups and removal. Clays have long been used in this application on the basis of high water absorption to form clumps that are structurally amenable to separation. However, clays have become disfavored in many settings owing to the high density, sulfate leaching and the tendency to foul piping. In response to these limitations, the prior art has resorted to various types of starches, gums, and cellulose as an alternative to clay.

As these alternative materials become gelatinous through hydration of polymeric chains as opposed to water adhering to clay surfaces and intercalating between clay platelets, different loadings of carbohydrate based polymeric clumping agents are required to achieve an overall clumping effect similar to that of clays.

Guar gum has been a preferred component of clumping agents. Clumping agents composed of guar gum have a clump durability of at least 95%. However, in recent years increased demand for guar gum primarily from the oil industry for use in drilling and by the natural gas industry for use in the hydraulic fracturing process for sourcing natural gas has caused created a shortage of guar gum for a variety of applications including usage in animal litter. Other gums such as xanthans, and other mannose based gums provide varying degrees of room temperature gelation and also suffer from shortages. Starches and celluloses have had lesser success as a clumping agents or gelling agents in settings where high clump strength and high water absorption capacity as a function of agent weight are required, but the starches may be combined with other agents to balance costs, functions and properties.

US Patent Publication 20140000525 (Schumski) discloses a clumping agent composition is provided that includes a pre-gelled starch divided to a starch size with at least 70% by weight of said starch being −200 mesh. An polyoxygenated moiety is present and includes at least one of borax, bicarbonate, or aluminate. The starch and the polyoxygenated moiety combined to form the clumping agent composition with a rapid build of viscosity when wet. A litter is formed when the clumping agent composition is present from 1 to 10 total weight percent decorating the surface of a particulate. Divided carboxymethylcellulose is included in some embodiments along with the starch and the oxygenated moiety.

US Patent Publications 20130220228; 201320260859; 20090181849; and 20080110404 (Theis) describe an animal litter is provided for simultaneously delivering urine-absorbent and mental-stimulating properties of the litter. The litter includes in combination a plurality of urine-absorbent particles forming a litter particulate component and a plurality of unfoldable polymeric cylinders constituting a polymeric cylinder component and intermixed with the urine-absorbent particles. The polymeric cylinders have a mean cylinder height of between 1 and 30 millimeters, a ratio of cylinder height to cylinder diameter of 1:1 to 12:1, and a strip length to cylinder height ratio of greater than 10:1. The litter particulate component is present relative to the cylinders in a volume ratio of 1:1 to 25:1. A process is further provided to mental stimulation and boredom reduction of a caged animal.

US Patent Publication 20080261816 (Birthisel) describes an inventive flowable granular material for adhesion to foliage, which material includes peanut hull fragments as a preferably majority lightweight component, a heavy weight component mixed therewith to improve the flowability of the resultant granular material, and a solvent to aid in the transfer of the foliar active agent to a leaf surface and foliar adhesion. Related particle size distributions and densities are described. Also provided is a process for promoting plant growth comprising: broadcast distributing the inventive flowable granular material to adhere to foliar surfaces; and releasing the foliar active agent onto the foliar surface. This composition may also be used in litter environments or otherwise in the foliage application field benefit from other benefits of the added iodine-releasing materials.

US Patent Publication 20070104749 (Birthiser) discloses a pesticide granule is provided that includes a base carrier particle. A liquid pesticide coating is applied to the particle surface, The coating may contain adjuvants. The coating has sufficient tack to adhere a second powdered pesticide to the carrier particle. The usage of tackifying agents to render the particle surface tacky enough to adhere powdered pesticide is reduced or eliminated. The powdered pesticide is sized to a mean diameter of less than 10% of the carrier diameter to promote adhesion. The synergistic rapid acting pesticide delivery associated with the granule results in the usage of less pesticide to control a given pest with reduced environmental impact. Bifenthrin is a representative of the liquid pesticide. This composition may also be used in litter environments or otherwise in the foliage application field benefit from other benefits of the added iodine-releasing materials The following US Patents including technology of the inventor, evidence the use of various iodine-releasing technologies in various environments, including those where animal waste is released, to moderate issues with the waste environment. Those US Patents include U.S. Pat. Nos. 8,846,067; 8,734,559; 8,642,057; 8,574,610; 7,943,158; and 7,867,510. U.S. Pat. No. 6,146,725 (Code) further shows the use of particulate combinations of KI and copper sulfate to release iodine in an aqueous environment.

Each reference cited in this document is incorporated in its entirety herein by reference.

SUMMARY OF THE INVENTION

A litter composition is used in the absorption of animal wastes with aqueous content in the waste. The composition may include: a particulate water-absorbing solids carrier; two solid particles of separate salts that will react in the presence of water to generate molecular iodine; and a solid acid releasing system that releases acid in the presence of the water generating iodine in sufficient amount to maintain a pH of between 3.5 and 7.5 with the reacted residue of the two solid particles and the released acid in the water.

DETAILED DESCRIPTION OF THE INVENTION

The present technology includes methods and compositions for use in the field of the invention. The compositions include a litter composition for use in the absorption of animal wastes with aqueous content in the waste. The composition may include:

a particulate water-absorbing solids carrier;

two solid particles of separate salts that will react in the presence of water to generate molecular iodine; and a solid acid releasing system that releases acid in the presence of the water generating iodine in sufficient amount to maintain a pH of between 3.5 and 7.5 with the reacted residue of the two solid particles and the released acid in the water.

The litter composition may have the particulate water-absorbing composition include natural or synthetic water-absorbent particulates. The water-absorbent particulates may, by way of non-limiting examples, include at least one material selected from the group consisting of husk; stem; leaves; pulp; papers; cellulosic solids; wood particles, fibers or chips; water-insoluble porous materials which absorb or adsorb the film-forming material within the structure, porous ceramic particles, crushed porous stone, crushed concrete, diatomaceous earth, polymeric particles and blends thereof. The organic, natural, plant-derived materials may be from agricultural or woodland growth, such as residue or products from plants bearing fruits or vegetables, shrubs, trees, grasses, and the like. The cellulosic solids may be present as "particles," which includes chips, flakes, shreds, or fibers of plant material from any part of the plant. The litter composition may further include starch in a concentration sufficient that upon release of iodine in the presence of water, a color change caused by reaction of the iodine with the starch will become visible to the human eye. As noted earlier, in the absence of other coloring reactions or materials, be a purple to brown color.

The litter composition may further include a clumping agent composition such as one including: a starch divided to a starch size with at least 70% by weight of said starch being −200 mesh; an oxygenated moiety including at least one of borax, bicarbonate, or aluminate; said starch and said oxygenated moiety combined to form the clumping agent composition. The starch may, by way of a non-limiting example, be pre-gelatinized modified potato starch. The starch may be present as a percentage total of the starch at a minimum of 80% or at least 95% by weight passing through a −200 mesh.

The litter composition may further include a cellulose, wherein said cellulose is at least one of ethylcellulose, hydroxyethylcellulose, hydroxy-methylethylcellulose, hydroxyethylpropylcellulose, methylhydroxyethyl-cellulose, or methylcellulose. The litter composition preferably has the cellulose present as a carboxymethylcellulose. The starch may have a degree of cold water solubility prior to being divided, and the starch may be present as from 10 to 90 total weight percent of the composition. The litter composition may further contain at least one of a dust control agent guar gum, clay, fragrance, a pH indicator, a dye, a pigment, an inert filler, xanthan gum, locust bean gum, or combinations thereof. A non-limiting example of a preferred oxygenated moiety is borax. The clumping agent composition may include: pre-gelatinized starch having a starch size with at least 70% by weight of said starch being −200 mesh; an oxygenated moiety including at least one of borax, bicarbonate, or aluminate; and carboxymethyl cellulose (CMC) divided to a CMC size of more than 80% by weight of said cellulose being −80 mesh, said starch, said oxygenated moiety, and said CMC combined to form the clumping agent composition. Both the pre-gelatinized starch and said CMC may be finely ground to a minimum of about a −80 sieve size, or the pre-gelatinized starch and said CMC may have at a minimum 80% by weight passing a −200 mesh. The litter composition may have the clumping composition present as from 1 to 10 total % by total weight of the litter composition.

The present invention has utility as a clumping agent operative in a variety of settings including animal litters, foodstuffs, pharmaceuticals and nutraceuticals, oil and gas extraction, personal care products, and concrete castings. An inventive composition is formulated from a combination of a finely divided water swellable starch and a borate, carbonate, or a combination thereof. In certain embodiments, a cellulose component is present. With intending to be bound to a particular theory, the cellulose component is believed to facilitate a rapid build in clump strength, after which the starch component begins to build clump strength. In certain embodiments, the inventive clumping agent when present with a substrate material as an litter or absorbed for spills provides clump durability of at least 95%. Embodiments of the inventive clumping agent are operative independent of the use of guar gum and other shortage prone gums while maintaining the required clumping durability. In still other embodiments of the present invention such gums are used in lesser quantities along with the inventive starch. Embodiments of the inventive clumping agent may be used in paints, food products, animal litter products, as well as in injection fluids for the oil service and natural gas industry. The surprisingly high degree of gelation and clump durability of the present invention is based on the discovery that in addition to the chemical properties of the starch and cellulose used herein, these components must be finely divided to a size below that commonly manufactured and used.

It is to be noted that U.S. Pat. No. 8,734,559 (Code) discloses liquid solutions (aqueous or alcoholic) comprising iodine stabilized by acid materials in the solutions. The preferred source of iodine in the solution is by the combination of an iodide salt with a positive metallic ion salt, with potassium iodide and cupric sulfate as the preferred source of iodide and metal cation.

In the above Code Patent, an iodine solution (as generated herein) is acidified by the addition of an acid that (alone) produces a pH of less than 6.7 at 1.0 N in deionized water and preferably less than 6.5 under those parameters. Preferably, the solution created by the added aqueous material (e.g., preferably water), the salts generating the iodine in the solution, and the acid produce a solution with a pH between 3.0 and 7.5, preferably between 3.5 and 6.9, and more preferably between 5.0 and 6.7. Typical acids may be organic acids, inorganic acids, Lewis acids, HCl, HI, HBr (halogenic acids), $HNO_3$, $HClO_4$, $H_2SO_4$, $H_2SO_3$, and especially the family of sulfamic acids, including specifically sulfamic acid ($H_3NO_3S$), and combinations thereof.

The compositions of the present technology may include a flowable particle or small solid pieces blend of at least three separate and distinct materials or particles for application to an environment that is a habitat for an animal. The pourable or scoopable composition providing both absorbency and antimicrobial activity comprising: a) a water absorbent solid carrier material carrier; b) a two component reactive composition; the reactive composition comprising essentially of at least two separate particles as a first particle comprising a metal cation and balancing anion (e.g., preferably) $CuSO_4$ reagent and a second particle comprising an inorganic cation and iodide anion (e.g., KI reagent), and c) optionally a clumping composition within the pourable or scoopable composition for the pourable or scoopable composition. The first particle and the composition of the second particle reacting with each other in the presence of water to produce molecular iodine, each of the first particles and the second particles being carried by the water absorbent solid carrier material (which is preferably clumpable in the presence of water) so that application of aqueous liquid (preferably at least 1%, up to equal to 100% or more by weight of the reactive composition to the composition) will cause the reagents of the at least two separate particles to be combined by the aqueous liquid and react with each other (and where clumpable, cause the local carrier to clump by action of the clumping material within the pourable composition); and wherein the two separate particles and the water absorbent carrier are pourable or granular, the reactive composition providing a local concentration (local may be within the clumped material only) of at least 2, at least 5, at least 8 or at least 10 parts per million iodine in the aqueous liquid in the local volume used to measure the local concentration applied to the granular composition when the granular composition has, for example 0.5-5% by weight of aqueous liquid present in the water absorbent solid carrier material with respect to the total weight of the water absorbent solid carrier material. Note that where the clumping material and/or other carrier in the pourable scoopable composition (the terms can be considered to be within the generic descriptor "pourable composition") is a starch or carries starch within it, the release of the iodine will cause the well-known iodine stain, color change of a purple, purple-brown, brown color) that can be readily observed. In this manner, the human manager of the litter system can readily identify where the litter has been activated so that the whole mass of litter does not have to be raked to filter for the "used" material. This is equally effective with clumping and non-clumping compositions.

The iodine environment can be provided in numerous and varied tasks and services and even in combination with other additives such as stable active solutions or film-breaking compositions such as acids (e.g., sulfamic acid, hydrochloric acid, sulfuric acid, enzymes, etc.). At present, the most widely known and accepted acidizing agents include HCl, sulfamic acid, lactic acid, citric acid, and acetic acid, all with varying degrees of reactivity for descaling. The effect of acidizing with iodine gas in solution, however, also attends with additive antimicrobial effects, and when the acidized iodine is combined with sulfamic acid, a powerful and effective method is provided for dissolving and remediating biofilms, and chelating heavy metals which may be solubilized by the process, or otherwise contained in water, especially after physical disruption as described herein. The acid may be present in any amount desired, with an amount that is at least 0.01N in the aqueous environment being desirable.

The solution is preferred where the acid comprises a sulfamic acid compound having the formula: $NR_2SO_3H$, wherein R is independently selected from the group consisting of hydrogen and electron-withdrawing groups. Sulfamic acid and derivatives within the generic formula are generally a white crystalline solid. Density of about 2.1 g/cm3. Melting point (for sulfamic acid) at 205° C. Combustible. Irritates skin, eyes, and mucous membranes. Low toxicity. It has been mainly used to make dyes and other chemicals. The acid may comprise a sulfamic acid compound having the formula: $NR_2SO_3H$, wherein R is independently selected from the group consisting of hydrogen, halogen, cyano, C1-C6 alkyl, C1 to C6 substituted alkyl, perhalo alkyl, halosubstituted alkyl, and electron-withdrawing groups. The solution may have at least one R is hydrogen in the sulfamic acid compound or only and exactly one R is hydrogen.

Sulfamic acid is also a primitive surfactant, and when added to free iodine in water and stabilized by varying added compounds such as silicates (e.g., sodium metasilicate) and phosphates and sulfonates (e.g., sodium xylene sulfonate or phosphate), yields a disinfecting and biofilm removing detergent compound which is active within the technologies described herein for oilfield or watershed applications as a single formulary product. The term a "sulfamic acid compound" or a member of the family of sulfamic acids or class of sulfamic acids is herein defined as any sulfamic acid central moiety with a single substituent on the amide group of the sulfamic acid moiety or sulfamic acid core structure that still allows the sulfamic acid derivative in the family of sulfamic acids to display a pH of less than 6.8 at 0.5N in deionized water, preferably less than 6.5 under those parameters (e.g., 5.5 to 6.7, 5.5 to 6.2, and 4.0-6.7, and 3.0 to 6.7 and even lower levels of acidity up to 6.5, up to 6.6 or up to 6.7 pH). As non-limiting examples of these known sulfamic acid family compounds are sulfamic acid, iodosulfamic acid, chlorosulfamic acid, bromosulfamic acid, fluorosulfamic acid, alkylsulfamic acid (with C1-C8 carbon groups, whether linear, branched or cyclic, such as cycloheylsulfamic acid, and substituted or not, such as trifluoromethylsulfamic acid, pentachloroethylsulfamic acid, etc.), cyanosulfamic acid, any electron-withdrawing group on the amide position of the sulfamic acid and even lightly electron-donating groups that do not change the sulfamic acid from an acid to a base at 1.0N in deionized water.

The formula for the specific compound named sulfamic acid is $NH_2SO_3H$ and the corresponding formula for a sulfamic acid compound is represented by:

$NR_2SO_3H$, wherein R is independently selected from the groups described above, such as hydrogen, halogen, cyano, C1-C6 alkyl or substituted alkyl, perhalo alkyl, halosubstituted alkyl, electron-withdrawing groups, mild electron-donating groups and the like. It is preferred that at least one R group is hydrogen. The hydrogen atom in the formula may also be replaced by an acidic cation or even an esterifying group.

The inventor has previously noted (U.S. Pat. No. 8,734, 559) that the addition of sulfamic acid (in particular) to all CupriDyne™ treatment composition formulas can provide ultimate stability or even enhanced activity in its various antimicrobial or surface treatment procedures. The sulfamic acid is both an acidifying agent (and other acids may be used) and a primitive surfactant. CupriDyne™ antimicrobial compositions in water is stabilized (free iodine is continuously available) by lowering pH to 5.5-6.7. Even the CuI resulting salt component is held in solution. The addition of surfactants, such as sodium metasilicate and sodium tripolyphosphate assists in completing a detergent preparation formula.

In the present technology, the iodine producing compounds and the solid sulfamic acid compounds (or other acceptable acid-producing compounds) are added into the litter compositions, retaining their solid form until liquid (e.g., aqueous liquid, including animal waste) contacts the solid ingredients. The absorbent solids will retain and in moderation release the generated iodine in active form into the litter composition. This release can have many different functional activities, including antimicrobial activity, anti-odor activity, use notification (e.g., the iodine will react with starch to generate a purple, brown-purple stain) and is safe to the animals using the material. It is noted that the main ingredients of copper ion, iodide, Potassium and Sulfate, and their specific salts used in the formulation are generally regarded as Safe (GRAS) by the FDA, even for human consumption and exposure. As noted elsewhere herein, although sulfamic acid may be an irritant, it is non-toxic and in the small amounts used as a buffering/stabilizing agent for the iodine-producing chemical reagents, it is not expected to have even a long-range effect on animals using the material. Also, the sulfamic acid when dissolved is held by the absorbent material, and when activated with the clumping agent, is retained in the clumps and removed with the clumps.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, water swellable is defined as a material absorbing more than 5 percent of the dry material weight in liquid water 500 micron particle after 1 hour.

As used herein, finely divided composition components of starch are defined as having at least 70% by weight passing a −200 mesh screen size, in other embodiments more than 80% by weight of the starch component passes a −200 mesh screen and preferably 95% by weight of the starch component passes a −200 mesh screen. In certain embodiments such an animal litter, the clump durability as measured by the Goldstein clump strength test method is at least of 90%, and more preferably 95%. It is appreciated that these clump durability values are achieved by adjusting the swelling properties of the starch and cellulose components, as well as the quantity of inventive clumping agent relative to substrate particulate of for example an animal litter.

As used herein, finely divided composition components of cellulose are defined as having at least 70% by weight passing a −80 mesh screen size, in other embodiments more than 70% by weight of the cellulose component passes a −200 mesh screen and preferably 95% by weight of the cellulose component passes a −200 mesh screen.

An inventive clumping agent composition regardless of whether it contains additional optional ingredients has the ability to absorb 0.1 parts by weight water per part by weight of inventive clumping composition as measured by pre-weighing the composition on a dry and after contact with water and subsequent draining of free water from the resultant gel. In other embodiments the inventive composition is able to absorb between 0.3 and 2 parts by weight water per part by weight of inventive clumping composition.

Without intending to be bound to a particular theory, the high degree of clumping achieved by the present inventive is believed to result from chemical changes that occur through the division of the starch and cellulose components to the sizes used in the present invention. The finely divided materials of the clumping agent are formed by milling or grinding followed by screening. Milling or grinding to a size distribution is readily accomplished with a commercially available milling machine, hammer mill, pin mill, knife mill, air mill, or pulverizer. A Champion hammer milling machine (Waterloo, Iowa) is representative of such a milling machine. It should be appreciated that these techniques impart transiently high mechanical forces and thermal inputs to the starch and cellulose starting materials. Starch in particular is known to have a complex form with crystalline and amorphous regions, as well as varying amounts of amylose. One of skill in the art appreciates that in general the higher the amylose content, the lower is the swelling power and the lower is the gel strength for the same starch concentration.

A starch component of an inventive clumping agent is selected to have at least a degree of cold water solubility prior to being finely divided. Cold water solubility is typically imparted through chemical modification, pre heating, or a combination thereof. Starches operative herein with a degree to cold water solubility illustratively include modified starches with the corresponding European Commission food additive numbers of E1400 Dextrin, E1401 Modified starch (Acid treated starch), E1402 Alkaline modified starch, E1403 Bleached starch, E1404 Oxidized starch, enzyme treated starch, E1410 Monostarch phosphate, E1412 Distarch phosphate, E1413 Phosphated distarch phosphate, E1414 Acetylated distarch phosphate, E1420 Acetylated starch, mono starch acetate, E1421 Acetylated starch, mono starch acetate, E1422 Acetylated distarch adipate, E1430 Di starch glycerine, E1440 Hydroxy propyl starch, E1441 Hydroxy propyl distarch glycerine, E1442 Hydroxy propyl distarch phosphate, E1450 Starch sodium octenyl succinate, E1451 Acetylated oxidized starch and combinations thereof. It is appreciated that pre-heating imparts a degree of cold water solubility to any of the aforementioned that is enhanced by the division process used in the present invention. Subsequent drying of pre-heated starch occurs with resort to techniques such as extrusion, drum drying or spray drying. It is appreciated that the gelatinization temperature of starch depends upon plant type and the amount of water present, pH, types and concentration of salt, sugar, fat and protein in the recipe, as well as derivatization technology used. Some types of unmodified native starches start swelling at 55° C., other types at 85° C. The gelatinization temperature depends on the degree of cross-linking of the amylopectin, and can be modified by genetic manipulation of starch synthase genes or chemical modification as detailed above. During gelatinization, water acts as a plasticizer. Water is first absorbed in the amorphous space of starch, which leads to a swelling phenomenon during heating and then transmitted through connecting molecules to crystalline regions. Water enters tightly bound amorphous regions of double helical structures to swell amylopectin, thus causing crystalline structures to melt and break free. Stress caused by this swelling phenomenon eventually interrupts structure organization and allows for leaching of amylose molecules to surrounding water. During gelatinization of starch three main processes happen to the starch granule: granule swelling, crystal or double helical melting, and amylose leaching. Gelatinization improves the availability of starch for amylase hydrolysis. As a result such pre-gelled starches are used in inventive embodiments where a rapid build of clump strength is required.

The nature of the base starch prior to chemical modification or heating and drying as detailed above or subjected to pre-gel treatment illustratively includes wheat, corn, potato, rice tapioca, sweet potato, sago, and mung bean. In a specific inventive embodiment, pre-gelatinized potato starch is used a starch component for further division for usage in an inventive composition. Regardless of the specific nature of the starch component of an inventive composition, the finely divided starch component is present from 10 to 90 percent by weight of an inventive clumping agent composition. In other embodiments, the finely divided starch component is present from 15 to 97 percent by weight of an inventive clumping agent composition.

It has been found that the inclusion of an inorganic polyoxygenated moiety of borax (disodium tetraborate), bicarbonate (hydrogen carbonate ($HCO_3^-$), sodium aluminate, or a combination thereof is present. Without intending to be bound by a particular theory, it is believed the borate or carbonate moiety crosslinks with the hydroxyl moieties of the starch to build viscosity. The polyoxygenated moiety is typically present from 3 to 85 total weight percent of the clumping agent, while in specific embodiments, the polyoxygenated moiety is present from 5 to 25 total weight percent of the clumping agent. The sizing of the polyoxygenated moiety is less import owing to the water solubility thereof.

A cellulose component operative in an inventive clumping agent composition also has a degree of water solubility prior to being finely divided for use in the present invention and is present in some embodiments of the present invention. Celloluses used herein illustratively include cellulose esters such as cellulose formate, acetate, propionate, butyrate, valerate, caproate, heptylate, caprate, laurate, myristate and palmitate obtained by reaction with organic acids, anhydrides or acid chlorides; cellulose ethers derived from the reaction of cellulose with alkylating agents such as chloroacetic acid and alkylene oxides under basic conditions. Specific cellulose ethers operative herein illustratively include, carboxymethyl celluloses (CMC) such as anionic sodium carboxymethylcellulose (ASCMC) and nonionic hydroxyethylcellulose (HEC) and HEC modified with a long chain alkyl group, i.e. HMHEC (Hydrophobically Modified HEC), methylcellulose, ethylcellulose, hydroxyethylcellulose, hydroxy-methylethylcellulose, hydroxyethylpropylcellulose, and methylhydroxyethyl-cellulose.

It has been found that celluloses with a viscosity of greater than 5,000 centipoise (cps) and in still other embodiments between 10,000 and 50,000 cps are well suited for usage in an inventive composition. Such celluloses are then finely divided as detailed above to achieve an increased degree of clumping ability and gelation of water as compared to an equivalent weight of conventional, coarse sized cellulose.

In a specific embodiment pre-gel modified potato starch has been found to absorb more water than other types of starches, and CMC absorbs more water than guar gum when equally sized according to the present invention of greater than 70% by weight of each milled to be −200 mesh (smaller than 74 micron particle size). The combination of pre-gel modified potato starch and CMC provides a high degree clump durability compared to guar gum at like loadings. The finely divided cellulose component is present from 0 to 70 percent by weight of an inventive clumping agent composition. In the simplest version of the present invention, the cellulose makes up the remainder to the composition relative to the starch component and polyoxygenated moiety.

In certain embodiments, the performance of the clumping agents is enhanced inclusion of dust control agent (DCA) such as a vegetable or petroleum based oil may be used to control potential dust from the find grinds of a base inventive, and to tack the clumping agent on to the surface of the base material. Other optional additives include conventional clumping agents such as guar gum or clay; fragrances; pH indicators; dyes; pigments; inert fillers; baking soda; xanthan gum, locust bean gum, bentonite clays, and combinations thereof.

The use of a biobased inventive clumping agent offers several advantages. Biobased materials are renewable resources and are particularly suited to potentially lowering the carbon footprint, and are suitable for composting, and therefore have the potential to lessen landfill burdens and fouling of sewage and other piping systems.

To produce a clumping animal litter, the clumping agent may be first dispersed in an oil, and in some instances with a non-ionic emulsifier present along with the polyoxygenated moiety. The resulting dispersion may be then distributed, e.g., by spraying, over a particulate material conventional to litters so as to provide a desired clumping agent concentration on the particulate substrate.

Suitable litter particulates illustratively include cellulosics such as corn cob, stover, wheatstraw, saw dust, tree bark, dried distillers grain, peanut shells, grain hulls, nut shells, citrus fruit peels, and straws; clays; gravels; diatomaceous earths; and combinations thereof.

What is claimed:

1. A litter composition for use in the absorption of animal wastes with aqueous content in the waste comprising:
   a particulate water-absorbing solids carrier;
   two solid particles of separate salts that will react in the presence of water to generate molecular iodine; and
   a solid acid releasing system that releases acid in the presence of the water generating iodine in sufficient amount to maintain a pH of between 3.5 and 7.5 with the reacted residue of the two solid particles and the released acid in the water.

2. The litter composition of claim 1 wherein the particulate water-absorbing composition comprises natural or synthetic water-absorbent particulates.

3. The litter composition of claim 2 wherein the water-absorbent particulates comprise at least one material selected from the group consisting of husk; stem; leaves; pulp; papers; cellulosic solids; wood particles, fibers or chips; water-insoluble porous materials which absorb or adsorb the film-forming material within the structure, porous ceramic particles, crushed porous stone, crushed concrete, diatomaceous earth, polymeric particles and blends thereof.

4. The litter composition of claim 3 wherein the cellulosic solids comprising chips, flakes, shreds, or fibers of plant material and the solid acid releasing material comprises sulfamic acid or a sulfamic acid derivative.

5. The litter composition of claim 1 wherein the composition further comprises starch in a concentration sufficient that upon release of iodine in the presence of water, a color change caused by reaction of the iodine with the starch will become visible to the human eye and the solid acid releasing material comprises sulfamic acid.

6. The litter composition of claim 1 further comprising a clumping agent composition comprising: a starch divided to a starch size with at least 70% by weight of said starch being −200 mesh; an oxygenated moiety including at least one of borax, bicarbonate, or aluminate; said starch and said oxygenated moiety combined to form the clumping agent composition.

7. The litter composition of claim 6 wherein said starch is pre-gelatinized modified potato starch and the solid acid releasing material comprises sulfamic acid.

8. The liter composition of claim 6 wherein said starch has at a minimum 80% by weight −200 mesh.

9. The litter composition of claim 6 wherein said starch has at a minimum 95% by weight passing a −200 mesh.

10. The litter composition of claim 6 further comprising a cellulose, wherein said cellulose is at least one of ethylcellulose, hydroxyethylcellulose, hydroxy-methylethylcellulose, hydroxyethylpropylcellulose, methylhydroxyethylcellulose, or methylcellulose.

11. The litter composition of claim 6 wherein said cellulose is a carboxymethylcellulose.

12. The litter composition of claim 6 wherein said starch has a degree of cold water solubility prior to being divided.

13. The litter composition of claim 6 wherein said starch is present from 10 to 90 total weight percent of the composition.

14. The litter composition of claim 6 further comprising at least one of a dust control agent guar gum, clay, fragrance, a pH indicator, a dye, a pigment, an inert filler, xanthan gum, locust bean gum, or combinations thereof.

15. The litter composition of claim 6 where said oxygenated moiety is borax.

16. The litter composition of claim 6 wherein the clumping agent composition comprises: pre-gelatinized starch having a starch size with at least 70% by weight of said starch being −200 mesh; an oxygenated moiety including at least one of borax, bicarbonate, or aluminate; and carboxymethyl cellulose (CMC) divided to a CMC size of more than 80% by weight of said cellulose being −80 mesh, said starch, said oxygenated moiety, and said CMC combined to form the clumping agent composition.

17. The litter composition of claim 16 wherein both said pre-gelatinized starch and said CMC are finely ground to a minimum of a −80 sieve size.

18. The litter composition of claim 16 wherein said pre-gelatinized starch and said CMC have at a minimum 80% by weight passing a −200 mesh.

19. The litter composition of claim 12 wherein the clumping composition is present as from 1 to 10 total % by total weight of the litter composition.

20. The litter composition of claim 16 wherein the solid acid releasing material comprises a sulfamic acid.

* * * * *